US010212962B2

(12) United States Patent
Dijkhuis et al.

(10) Patent No.: US 10,212,962 B2
(45) Date of Patent: Feb. 26, 2019

(54) DEVICE AND METHOD FOR PROCESSING A PINEAPPLE

(71) Applicant: Dutch Food Technology B.V., Roermond (NL)

(72) Inventors: Hendrikus Bernardus Dijkhuis, Deventer (NL); Pierre Van De Braak, Boxmeer (NL)

(73) Assignee: Dutch Food Technology B.V., Roermond (NL)

( * ) Notice: Subject to any disclaimer, the term of this patent is extended or adjusted under 35 U.S.C. 154(b) by 299 days.

(21) Appl. No.: 14/891,432

(22) PCT Filed: May 15, 2014

(86) PCT No.: PCT/EP2014/059961
§ 371 (c)(1),
(2) Date: Nov. 16, 2015

(87) PCT Pub. No.: WO2014/184298
PCT Pub. Date: Nov. 20, 2014

(65) Prior Publication Data
US 2016/0120210 A1    May 5, 2016

(30) Foreign Application Priority Data

May 15, 2013 (NL) ...................................... 1040216

(51) Int. Cl.
*A23N 7/00* (2006.01)
*A23N 4/20* (2006.01)
(Continued)

(52) U.S. Cl.
CPC ............... *A23N 7/002* (2013.01); *A23N 4/20* (2013.01); *A47J 17/14* (2013.01); *A47J 25/00* (2013.01); *B26D 3/26* (2013.01)

(58) Field of Classification Search
CPC . A23N 4/00; A23N 7/08; A23N 7/002; A23N 4/20; A47J 17/14; A47J 25/00; B26D 3/26
(Continued)

(56) References Cited

U.S. PATENT DOCUMENTS 1,542,554 A    6/1925  Jagenburg
2,034,160 A *  3/1936  Taylor ..................... A23N 4/20
                                                          198/572
(Continued)

FOREIGN PATENT DOCUMENTS

EP          0887035 A1   12/1998
GB          1569019       6/1980
WO     WO2013/036110 A1   3/2013

OTHER PUBLICATIONS

International Search Report with Written Opinion of the International Searching Authority, dated Jul. 25, 2014, with respect to International Application No. PCT/EP2014/059961.

*Primary Examiner* — Dana Ross
*Assistant Examiner* — Joseph Iskra
(74) *Attorney, Agent, or Firm* — Scott R. Cox (57) ABSTRACT

A device for processing a pineapple to produce pineapple flesh including a first processing unit for removing the outer ends from the pineapple and a second processing unit for simultaneously coring and peeling the pineapple, wherein the second processing unit includes a pusher and knife with two concentric blades and further includes a clamping unit.

24 Claims, 12 Drawing Sheets

(51) Int. Cl.
*A47J 17/14* (2006.01)
*A47J 25/00* (2006.01)
*B26D 3/26* (2006.01)

(58) Field of Classification Search
USPC ......... 99/505, 515, 539, 541, 542, 543, 544,
99/545, 546, 547, 584, 588, 591, 593,
99/636, 644; 30/300, 301, 113.1–113.3,
30/130, 117
See application file for complete search history.

(56) References Cited

U.S. PATENT DOCUMENTS

| | | | |
|---|---|---|---|
| 3,780,641 A | | 12/1973 | Hole |
| 4,441,413 A | * | 4/1984 | Mori ...................... A23N 7/002 |
| | | | 99/542 |
| 4,497,245 A | | 2/1985 | Mori |
| 4,606,263 A | * | 8/1986 | Ross ...................... A23N 7/002 |
| | | | 99/542 |
| 7,096,777 B1 | | 8/2006 | Healy |

* cited by examiner fig. 1 fig. 2 fig. 3 fig. 4 fig. 5 fig. 6 fig. 8 fig. 9 fig. 10a fig. 70b fig. 11

DEVICE AND METHOD FOR PROCESSING A PINEAPPLE

The invention relates to a device and method for processing a pineapple.

U.S. Pat. No. 7,096,777 discloses an automated high volume machine which receives pineapples, feeds the pineapples to a coring station, and removes the core and skin before a subsequent cycle.

The known machine comprises a lifting unit for lifting pineapples positioned on a scoop into a coring station. A first processing unit is located within the lifting path of the lifting unit, wherein the first processing unit comprises two blades for cutting the outer ends from the pineapple. The coring station is a second processing unit having a fluid cylinder and a push plate. Further, the coring station comprises a knife with two concentric blades. The automated machine is equipped with detectors for detecting pineapples and upon detection of a pineapple starting a respective processing step. These detectors have the drawback of providing error messages resulting in undesired machine interruptions.

Further, the scoop of the lifting unit carries the pineapple with minimal aligning, such that it is possible that a pineapple transferred from the conveyor belt onto the scoop is misaligned with respect to the two blades or becomes misaligned during cutting. This may negatively affect any further processing steps in the pineapple flesh production. Further, lifting the pineapple for processing requires relatively much energy. In addition, the configuration of the known machine requires a relatively large volume.

As a result, it is a first object of the present invention to provide a compact, efficient device for more accurately processing a pineapple. Further, it is a second object of the invention to provide an efficient automated method for more accurately processing a pineapple.

The first object of the invention is achieved by means of the features according to claim 1, whereas the second object is achieved by means of the features disclosed herein.

The clamping unit of the device according the invention clamps the pineapple to be processed into a desired orientation. A correctly positioned pineapple in the clamping unit is automatically properly aligned for processing in the first and in the second processing unit. Clamping a pineapple reduces the risk that the position of the pineapple changes in the first processing unit. Therefore, it is possible without any further alignment means to deliver the clamped pineapple without outer ends in a desired prescribed orientation to the second processing unit for simultaneously coring and peeling the pineapple.

The vertical operated pusher of the device according to the present invention makes a more compact design of device according to the invention possible. Further, the vertical operated pusher has compared to U.S. Pat. No. 7,096,777 a smaller area that is reached by splashes and trimmings produced in the second processing unit in use. Therefore, the clamping unit and the vertical operated pusher provide a compact, efficient device for accurately producing pineapple flesh.

The device according to the invention is in particular suited to promote selling of fresh pineapple flesh in supermarkets, because after a user has placed an unprocessed pineapple into the clamping unit, the flesh of the pineapple is ready to be sold in less than a minute.

In an embodiment of the device according to the invention the device further comprises a driving unit for displacing the clamping unit from an input position through the first processing unit to the second processing unit. In the input position an operator is able to position a pineapple to be processed in the clamping unit. The first processing unit is preferably provided with two stationary blades such that during displacement of the clamping unit from the input position to the second processing unit the outer ends from the pineapple can be simultaneously cut in a relatively efficient manner.

The clamping unit may comprise a cylindrical sleeve with clamping means attached to the inside wall of the sleeve. By means of the clamping means the pineapple is automatically aligned in a desired position in the sleeve for processing. In addition, the spring loaded clamping means are compressible to strongly clamp and hold pineapples of different sizes. The length of the sleeve is smaller than the distance between the two stationary blades such that the clamping unit is able to pass the two spaced stationary blades cutting simultaneously the pineapple. Alternatively, the clamping unit may comprise a gripping mechanism having at least two gripping arms moveable from an open position for positioning a pineapple between the arms to a clamp position clamping and holding the pineapple for processing the clamped pineapple. The arms may have a curved shape or curved contact surface for providing an improved contact with the pineapple. Preferably, the gripping arms are rotatable connected to each other and rotatable about one axis for moving the gripping arms from the open position to the clamp position. The gripping mechanism is dimensioned such that the clamping unit is able to pass the two spaced stationary blades cutting simultaneously the pineapple.

The clamping unit is displaceable in a substantially horizontal direction only such that from a constructional point of view an efficient device with a relatively simple design is provided. In a preferred embodiment the clamping unit is displaceable along at least a part of a substantially circular path. The circular path provides the opportunity that the central and from an operator perspective less accessible part of the device can more easily be protected against splashes and trimmings produced during the pineapple processing steps. In this way a more user-friendly device is provided in that the device is easier to clean.

The device according to the present invention further comprises a container below the knife of the second processing unit for collecting the pineapple flesh, wherein the vertical distance between the knife and the top of the container is less than 10 cm, preferably less than 2 cm. In this way it is possible to catch and guide the pineapple flesh as efficient as possible into the container.

The container may comprise a bottom and a central discharge channel for discharging the core, wherein preferably the inner diameter of the discharge channel substantially corresponds to the inner diameter of the inner blade of the knife. By means of the bottom, it is possible to catch a relatively large amount of the juice produced in the second processing step. The juice can be commercially attractive for conserving a packed pineapple, as a pineapple packed with the juice prevents quick dehydration of the pineapple flesh. Alternatively, it is possible to have a bottomless container, i.e. a container having two opposing open sides. The device may provide supporting means such as a supporting plate(s) and/or supporting rails to hold the pineapple flesh in the container. The bottomless container may have a relatively simple design, e.g. the bottomless container does not require a core discharge channel. Further, the bottomless container does not have any holding means itself, such that without any supporting means of the device the pineapple flesh falls out the container.

Preferably, the container is detachably coupled to the device for cleaning purposes or to provide the opportunity to change the bottomless container with the container having a bottom.

The container of the device according to the present invention is displaceable by means of driving means from a position below the knife to an output position. The output position is preferably located near the input position, at least on the same side of the device, such that a user can easily take the pineapple flesh away from the device and the device can be positioned at relatively many positions as only one side of the device needs to be accessible. To provide a device with a simple construction, the container may be displaceable in a substantially horizontal direction only. In a preferred embodiment the container is displaceable along at least a part of a substantially circular path. For this, the container may be rotatable connected to a stationary central frame part of the device. By means of the circular path the central part of the device can be easier protected against splashes and trimmings produced by the processing steps.

Further, if the clamping unit and the container are rotatable connected to the same stationary central frame part of the device, it is possible to construct a relatively compact device and to drive the container and the clamping unit with a single motor, i.e. one motor only. The length and/or width dimensions of the device are less than 2 meters, preferably less than 1 meter such that the area to be occupied by the device is minimal. Such a compact device may be transported relatively easy. The minimal floor area required by the compact device is in particular advantageous for a device to be positioned in a supermarket to promote the selling of fresh pineapple flesh.

In the device according to the present invention the center of the container in the output position substantially coincides with the center of the clamping unit in the input position. This provides a user-friendly device in that the accessibility to the input and output positions is optimal and a visual indication is provided to the user that the device is ready to be used and/or that the processing of the pineapple flesh has finished.

The device according to the present invention may comprise at least one additional processing unit such as a core removal station and/or a further cutting station. The additional processing unit is located between the second processing unit and the output position. By means of the core removal station it is possible to remove the core from the pineapple flesh or to verify that the core has been removed from the pineapple flesh in the second processing unit.

In the second processing unit the two concentric blades of the knife are connected by means of at least one spacer. In this way a compact and strong one-piece knife is formed, that can be detachably connected to the frame of the device. A detachably connectable knife is beneficial for cleaning the knife or for maintenance or cleaning the device without the risk that the operator injures himself. In addition, the knife may comprise a number of spacers between the two concentric blades, preferably circumferentially divided between the blades about equal angles. The spacers provide a device able to cut separate longitudinal extending pineapple flesh parts instead of a one piece such that more variety of presenting the pineapple flesh to an end-user can be provided. It is possible to use interchangeable knifes with different numbers of spacers dependent on the desired shape of the pineapple flesh. The variation in presentation of the pineapple flesh can even be increased if the device comprises a third processing unit having a further cutting station. In this embodiment the container sidewall requires openings such as notches to enable cutters of the third processing unit to reach the pineapple flesh in the container for further cutting. The cutters are pivotable about a pivot axis from a position outside the displacement path of the pineapple to a cutting position within the displacement path of the pineapple flesh for cutting a pineapple flesh section in the container. The openings or notches extend over 50-95% of the circumference of the container. The cutters make it possible to provide slices or disc-like pineapple parts if used without the spacers in the second processing unit. In combination with the spacers it is possible to produce dice-like pineapple flesh parts.

Further, it is possible to transfer the pineapple flesh from the container into a packaging such as a bucket. With the bottomless container this transfer is possible by means of the supporting means of the device such that the flesh is no longer held in the container. The container having a bottom may be emptied by turning the container for example 180 degrees, preferably with the packaging already attached to the container to be turned to avoid spillage.

The method according to the present invention comprises a first processing step in which the outer ends from the pineapple are removed, and a second processing step in which the pineapple without its outer ends is pushed through a knife with two concentric blades, wherein before the first processing step the pineapple is clamped in a clamping unit and in the second processing step the pineapple is vertically pushed out of the clamping unit through the knife for simultaneously coring and peeling the pineapple. By means of this method it is possible to produce pineapple flesh in a relatively accurate and efficient manner. In the method according to the present invention the number of wrongly cut pineapples in the processing steps is reduced to a minimum, whereas the produced amount of pineapple flesh is maximized.

In an efficient further method step the pineapple can be moved from an input position, via a flesh collection position to an output position, wherein the center of the output position corresponds with the center of the input position. In this way the processing steps can be executed relatively fast and the end product is presented to an operator in a user-friendly way. Further, the coinciding center lines provide a visual indication that the device is ready to be used and/or that the pineapple flesh producing process is finished.

Further, the pineapple may be moved from the input position in a half-circular path to the second processing step and the pineapple flesh is moved from the flesh collection position in a half circular path to the output position. With these circular paths, it is easier to protect the central part of the device against pineapple splashes and/or trimmings such that the device parts to be cleaned/removed for cleaning are easily accessible for an operator. In a further embodiment the pineapple is moved in a substantially horizontal extending path from the input position to the second processing step and the pineapple flesh is moved from the flesh collection position in a substantially horizontal extending path to the output position. In this way it is possible to process the pineapple efficiently without requiring much volume.

The invention will now be explained in more detail on the basis of exemplary embodiments in the appended drawings, in which:

Like parts are indicated by the same numerals in the figures.

Figure 3:
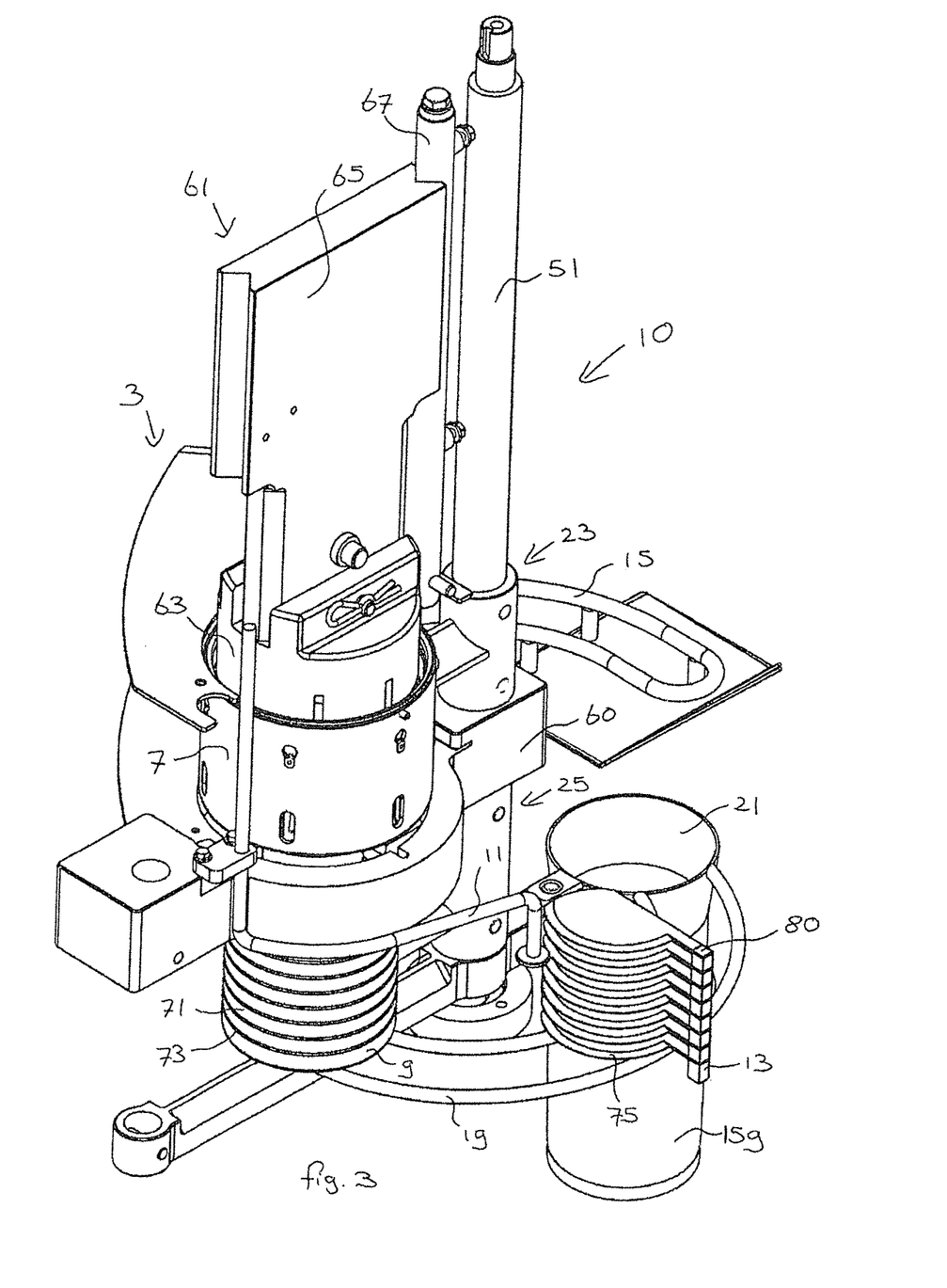
FIG. 3 is a partially cut-away perspective side back view of the embodiment of the device according to the invention shown in FIGS. 1 and 2.
Figure 4:
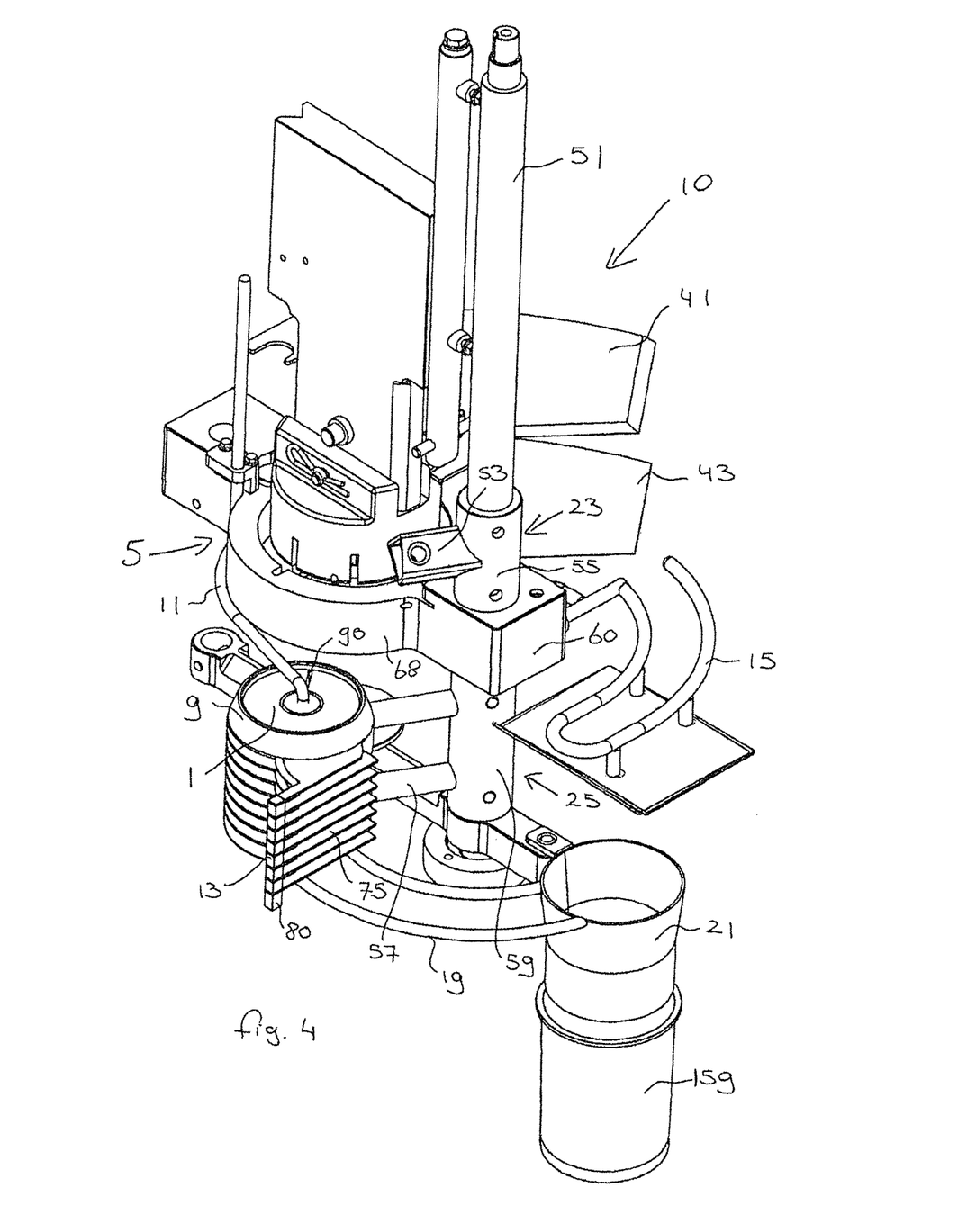
FIG. 4 is a partially cut-away perspective front side view of the embodiment of the device according to the invention shown in FIGS. 1-3.
Figure 5:
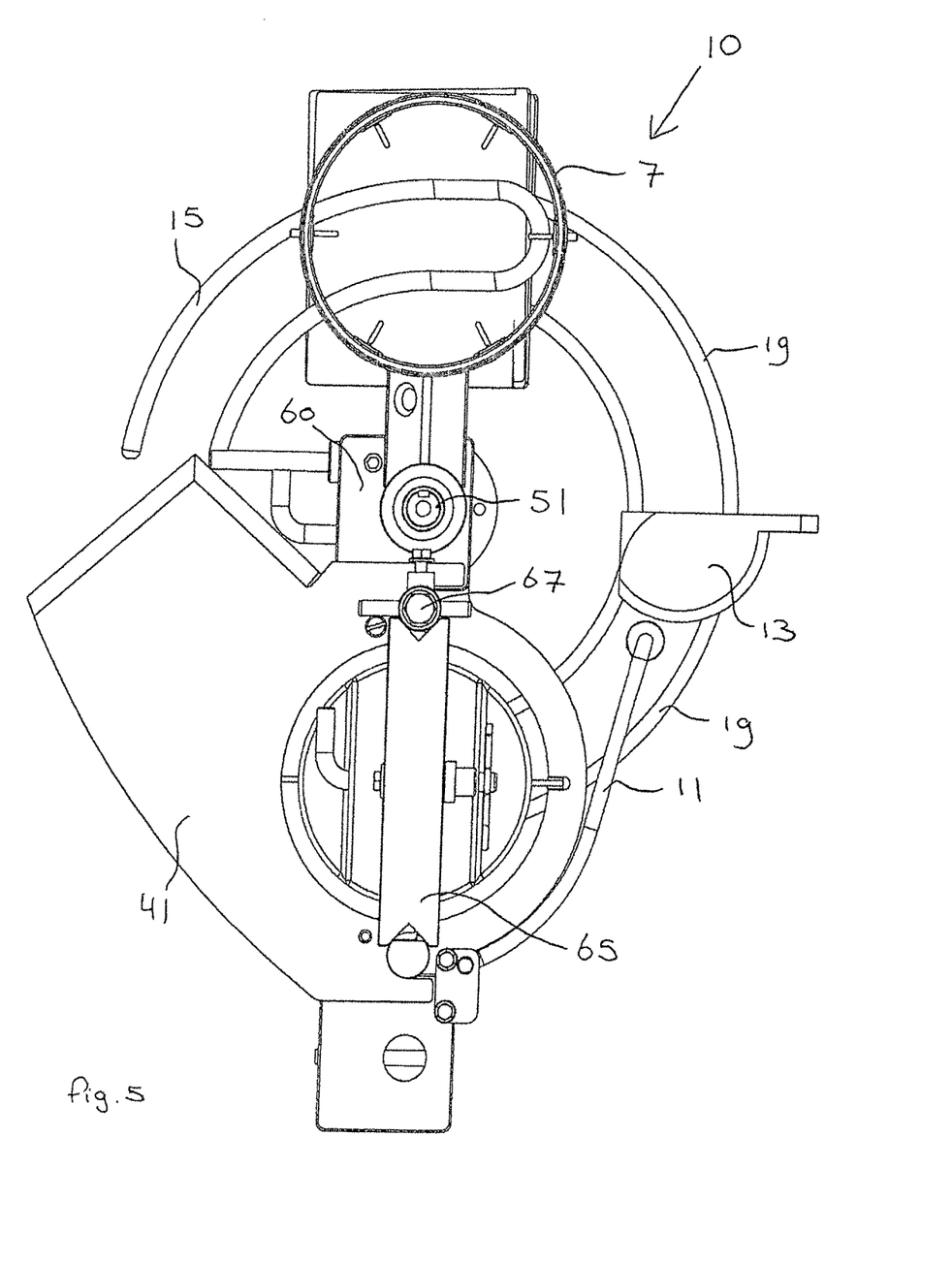
FIG. 5 is a plan view of the embodiment of the device according to the present invention shown in FIGS. 1-4.

FIGS. 1-4 show various perspective views from a different angle and FIG. 5 shows a plan view of an embodiment of the device 10 for processing a pineapple according to the present invention.

The device 10 comprises a first processing unit 3 for removing the outer ends from the pineapple and a second processing unit 5 for simultaneously coring and peeling the pineapple. Besides the first and second processing unit 3, 5 the following parts of the device 10 are also directly involved in the pineapple processing steps: a clamping unit 7, a container 9, a core removal station 11, a further cutting station 13, supporting means 15, 17, 19, and a guide sleeve 21.

The device 10 further comprises a driving unit 23 for displacing the clamping unit 7 from an input position (shown in FIG. 1) through the first processing unit 3 to the second processing unit (shown in FIG. 3). In the input position an operator is able to position a pineapple to be processed in the clamping unit 7. The clamping unit 7 comprises a cylindrical sleeve 31 with at least three clamping means 33 attached to the inside wall 35 of the sleeve 31.

The first processing unit 3 is provided with two stationary blades 41, 43 such that during displacement of the clamping unit 7 from the input position to the second processing unit 5 the outer longitudinal opposing ends from the pineapple can be simultaneously cut in a relatively efficient manner. Before reaching the blades 41, 43 the clamped pineapple is supported by rails 15 of the device 10.

The length of the sleeve 31 is smaller than the distance between the two stationary blades 41, 43 such that the clamping unit 7 is able to pass the two stationary blades 41, 43 cutting simultaneously the two opposing pineapple ends.

Figure 1:
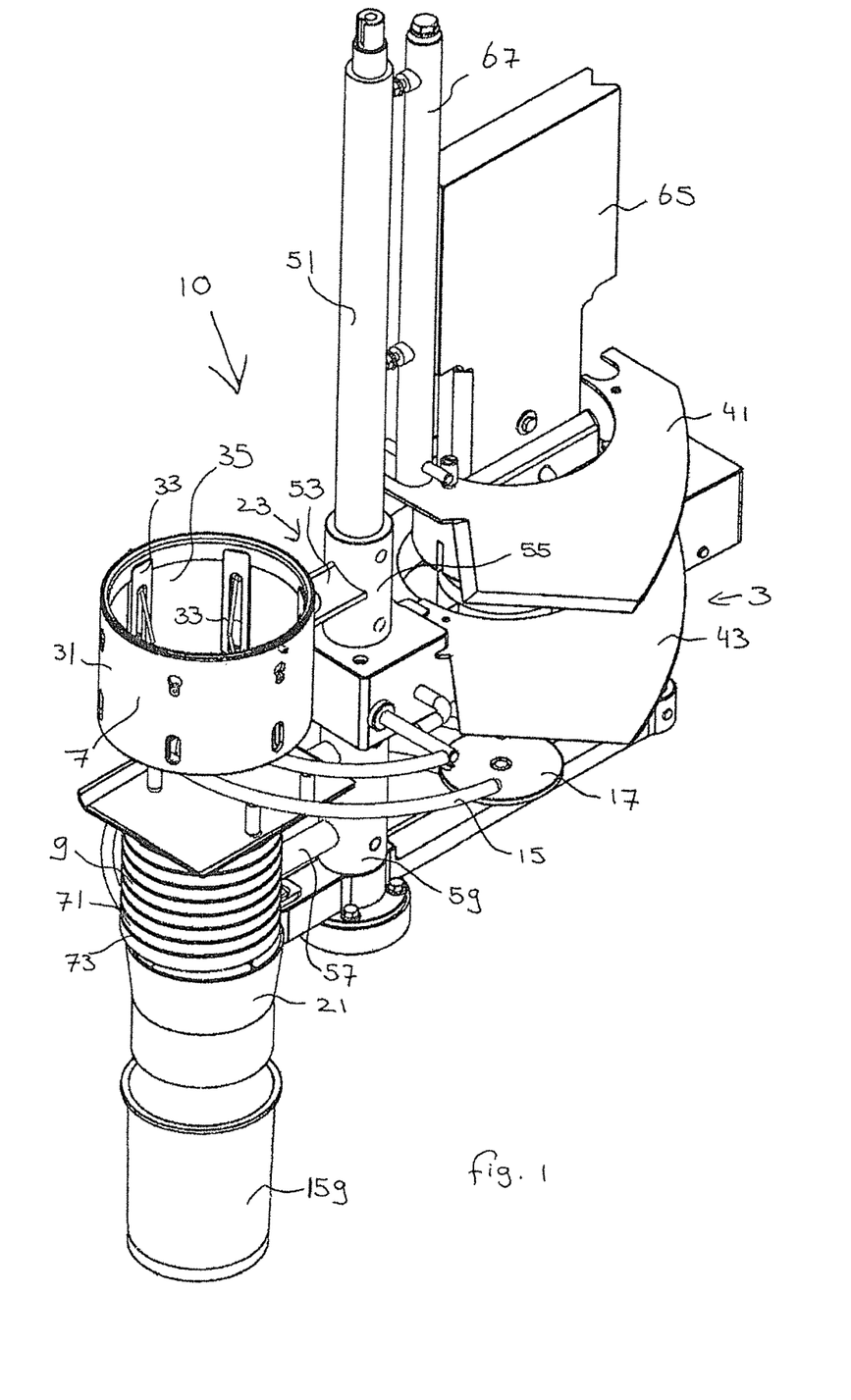
FIG. 1 is a partially cut-away perspective side front view of an embodiment of a device according to the invention.

The container 9 of the device 10 according to the present invention is displaceable by means of driving means 25 from a position below the second processing unit 5 to an output position (shown in FIG. 1). The container 9 and the clamping unit 7 are rotatable in a similar fashion around a stationary central frame part 51 of the device 10. The driving unit 23 and driving means 25 comprise arms 53, 57 and bearings 55, 59 and a common motor 60 for simultaneously displacing the clamping unit 7 and container 9 along a circular path in a horizontal direction only. The center of the container 9 in the output position coincides with the center of the clamping unit 7 in the input position. Between the position below the second processing unit 5 and the output position (shown in FIG. 1), the container 9 passes a third processing unit, i.e. the core removal station 11 and a fourth processing unit, i.e. the further cutting station 13. The container wall 71 comprises openings or notches 73 which are evenly distributed over the container's length and which extend over 80% of the container's circumference. The openings or notches 73 are able to receive cutters 75 of the further cutting station 13 during displacement of the container 9 for further cutting the pineapple flesh into a desired shape for selling for examples pineapple flesh slices or dices. The cutters 75 are pivotable about pivot axis 80 from a cutting position above the rails 19 in the moving path of the container 9 to a rest position and vice versa, wherein preferably in the rest position the cutters are located outside the moving path of the container such that if desired the container may pass the further cutting station without further cutting the pineapple flesh.

The container 9 is a bottomless container, i.e. the cylindrical container 9 has two opposing open sides. The device 10 provides supporting means 17, 19 to hold the pineapple flesh in the container 9 during moving and further processing the pineapple in the container 9. The supporting means for the container 9 comprise a supporting plate 17 and supporting rails 19. The supporting rails 19 end near the guide sleeve 21 such that the pineapple flesh falls out the container through the guide sleeve 21 into a bucket 159.

The second processing unit 5 has a pusher 61 comprising a pusher head 63 and a pusher plate 65, wherein the pusher head and the pusher plate 65 are vertically moveable with regard to device part 67 for pushing a pineapple out of the clamping unit. In addition, the second processing unit 5 has a knife 69 with two concentric blades (not shown), i.e. an inner circular blade for coring the pineapple and an outer circular blade for skinning the pineapple. The blades are connected to each other by means of one spacer. By means of the pusher 61 the pineapple without its outer ends can be vertically pushed out of the clamping 7 unit through the knife 69 for simultaneously coring and peeling the pineapple to produce pineapple flesh. With the clamping unit 7 in its end position in the second processing unit 5, the container 9 is positioned below the knife 69. In this position, the container 9 and the supporting plate 17 are able to catch and hold the pineapple flesh produced in the second processing unit 5. The vertical distance between the knife 69 and the container 9 is minimal and smaller than 2 cm.

The clamping unit 7 may comprise a clamping part detachably connected to a part of the clamping unit 7 fixed to the device 10. For example for cleaning purposes this clamping part can be detached from the part fixed to the device. It is also possible to change a detachable clamping part for another clamping part more suitable to clamp pineapples in a different size range. Further, the knife 69 is detachably connected to the knife holder 68 and the container 9 is detachably connected to the arms 57. In this way an operator friendly device is provided.

Figure 2:
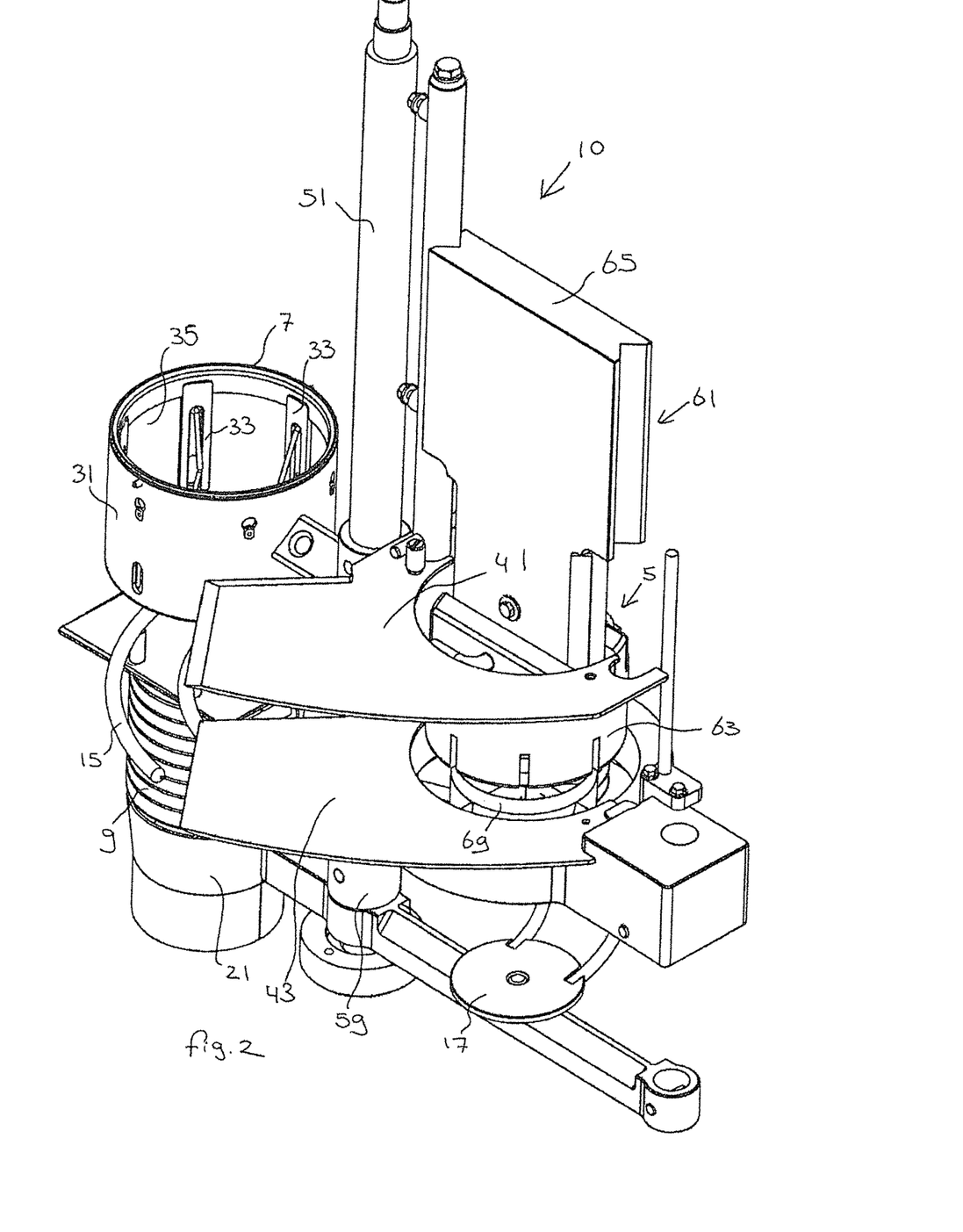
FIG. 2 is a partially cut-away perspective side back view of the embodiment of the device according to the invention shown in FIG. 1.

The device 10 according to the present invention is operated as follows. An operator positions a pineapple to be processed in the clamping unit 7. By means of the clamping means 33 attached to a cylindrical wall, the pineapple is automatically centered and orientated in the desired aligned position for processing. After positioning the pineapple in the clamping unit 7 the automated process is started. The motor 60 displaces the clamping unit 7 with the pineapple from the input position (FIGS. 1 and 2) through the first processing unit 3 to the second processing unit 5 (FIG. 3). During this displacement, the blades 41, 43 remove the outer ends of the pineapple. After the clamping unit 7 reaches the second processing unit 5, the pusher 61 vertically pushes the pineapple out of the clamping unit 7 through a knife 69 for peeling and coring the pineapple. The pineapple flesh is collected in the volume 1 of the container 9. After moving the pusher 61 back from its second position, the lowest point of the pusher head 63, to its first starting position, the highest point of the pusher head, the motor 60 displaces the container 9 from a flesh collection position (FIG. 3) to an output position (FIGS. 1 and 2). During this displacement of the container 9 the core removal station 11 verifies whether the core has been separated from the flesh. Then, the cutters 75 of the fourth processing unit 13 provide pineapple flesh slices. During the displacement the pineapple flesh in the container 9 is supported by the rails 19. In the output position the rails terminate in the guide sleeve 21 such that pineapple flesh will fall under influence of gravity into the bucket 159. After closing the bucket, the pineapple flesh is ready to be sold. Optionally, it is possible to provide a one-way safety valve in guide sleeve 21, such that the valve only opens for falling pineapples and access from outside to the device via guide sleeve 21 is restricted.

Figure 6:
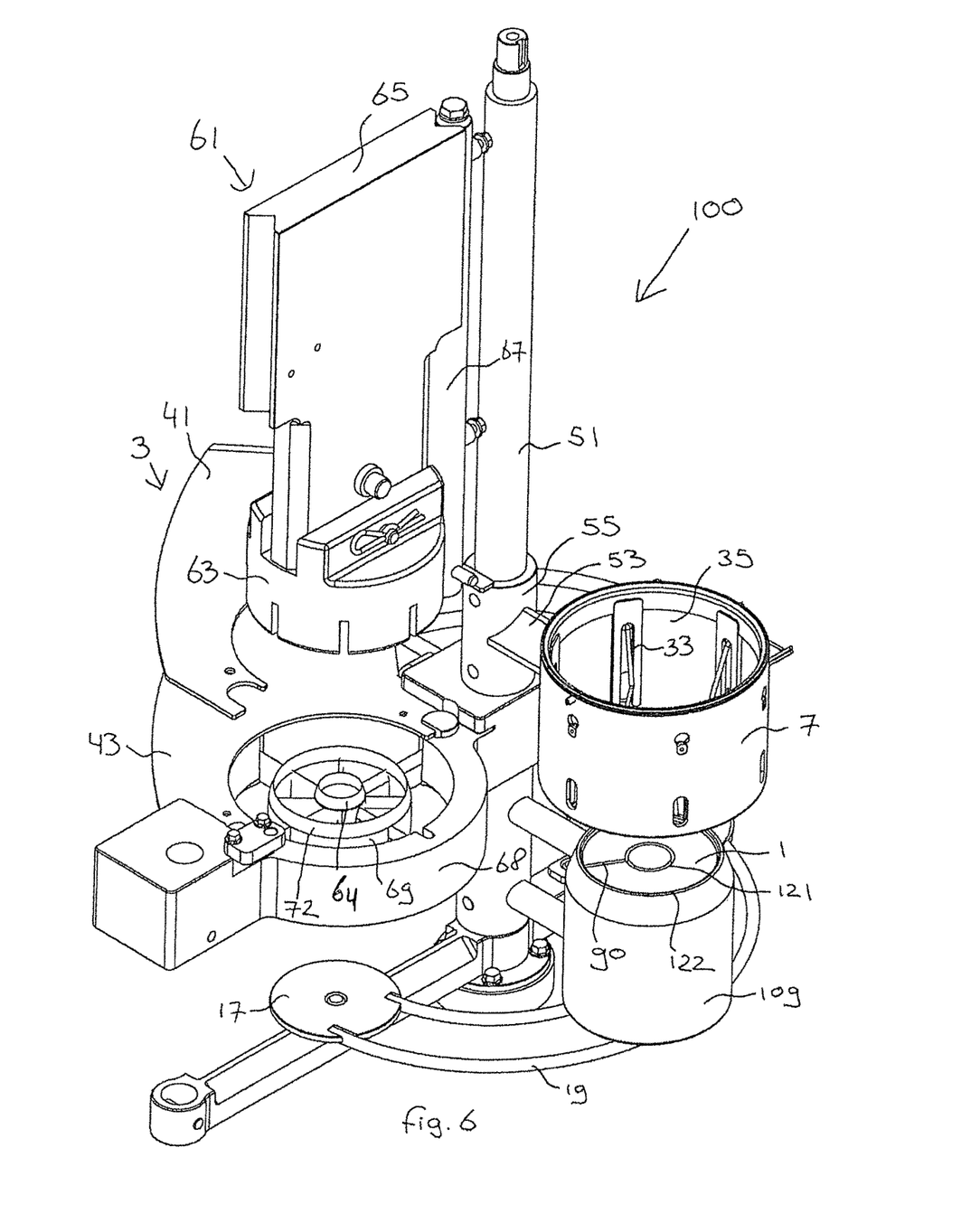
FIG. 6 is a partially cut-away perspective side back view of another embodiment of a device according to the invention.

FIG. 6 shows another embodiment of the device 100 according to the present invention. The same components have been given corresponding reference signs and these components will not be discussed in detail below. The difference between the device 10 and the device 100 is that device 100 only has two processing units, i.e. a first processing unit 3 and a second processing unit. Further, the container 9 has been replaced for a container 109 comprising a bottom (not shown) and a central discharge channel 121 for discharging the core through the bottom, wherein the inner diameter of the discharge channel 121 corresponds to the inner diameter of the inner blade 64 of the knife. The central discharge channel 121 is connected by an element 90 to the container wall. Further, the inner diameter of at least one container wall end edge 122 substantially corresponds or is larger than the inner diameter of the outer blade 72 of the knife 69.

The length and/or width dimensions of the device 10, 100 are about 1 meter such that the area to be occupied by the device is minimal.

In the device 10, 100 according to the present invention all power consuming parts such as motor 60 are located in the center of the device and/or above the processing units such as pusher 61. These positions minimize the chance that the power consuming parts are exposed to any splashes and trimmings produced during the processing steps without any relatively expensive preventive measures.

Figure 7:
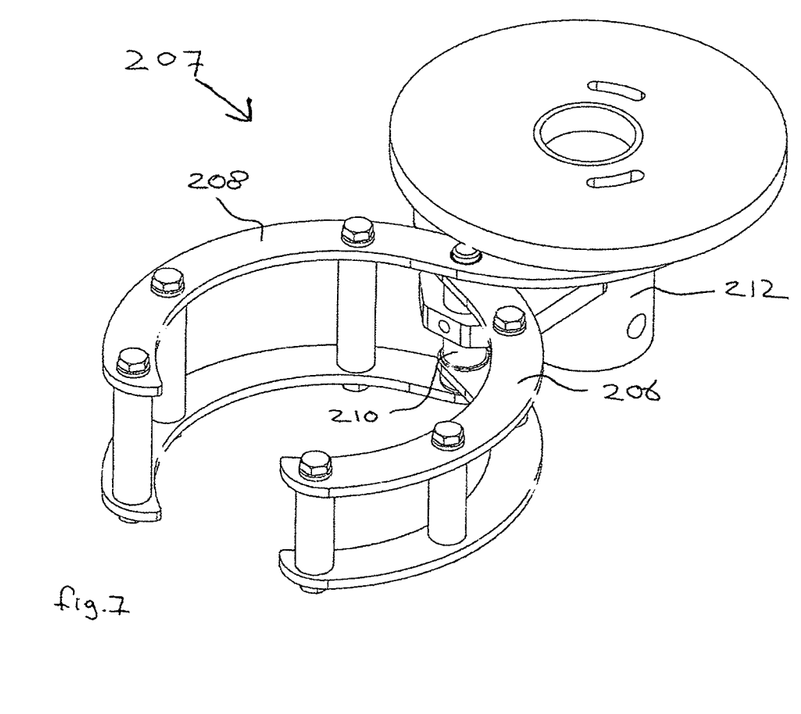
FIG. 7 is a perspective view of another embodiment of a clamping unit of the device according to the present invention.

FIG. 7 shows an alternative embodiment for a clamping unit of the device according to the present invention, i.e. a gripping mechanism 207. The clamping unit 7 shown in FIG. 1-6 can be exchanged with the gripping mechanism 207. The gripping mechanism 207 has two gripping arms 206, 208 moveable from an open position (shown in FIG. 7) for positioning a pineapple between the arms 206, 208 to a clamp position clamping and holding the pineapple for processing the clamped pineapple in the first processing unit 3. The gripping mechanism 207 is moved by means of the motor 60 from the input position to the second processing unit 5 and back to the input position. Each arm 206, 208 may have a curved semi-cylindrical shape for providing an improved contact with the pineapple. The gripping arms 206, 208 may be rotatable connected to each other and rotatable about one axis 210 for moving the gripping arms 206, 208 from the open position to the clamp position. Further, the gripping mechanism 207 is connected to central frame part 51 by means of an opening and closing mechanism 212. In the input position the gripping arms 206, 208 are in their maximum open positions. After rotating the gripping mechanism 207 a few degrees around the central frame part 51, the gripping arms automatically close by means of the opening and closing mechanism 212 such that the pineapple is firmly clamped therein for processing. Preferably, the gripping mechanism 212 is in its closed state after a maximum rotating angle of 45 degrees from the input position. A rotating angle of about 15 degrees from the input position is preferred for rotating the gripping arms 206, 208 from the open position to the closed clamp position.

For efficient cleaning or for increased safety purposes it is desired that as many components as possible involved in the processing steps of the device are detachably connectable to the device. Further, different detachable connectable components can be used to change details of a specific processing step. For example, it is possible to change the knife 69 having six spacers with a knife (not shown) having less or more spacers, e.g. with a minimum of one spacer and a maximum of sixteen spacers. The six spacers are circumferentially divided between the blades about equal angles of 60 degrees, wherein in the pineapple flesh six vertical extending cuts may be provided by means of the six spacers. In combination with the further cutting means 13 it is possible to provide pineapple flesh dices as an end product in the bucket 159. With the device 10 of the invention it is possible to produce pineapple flesh in one piece, pineapple flesh slices, pineapple dices and longitudinal extending pineapple parts.

Figure 8:
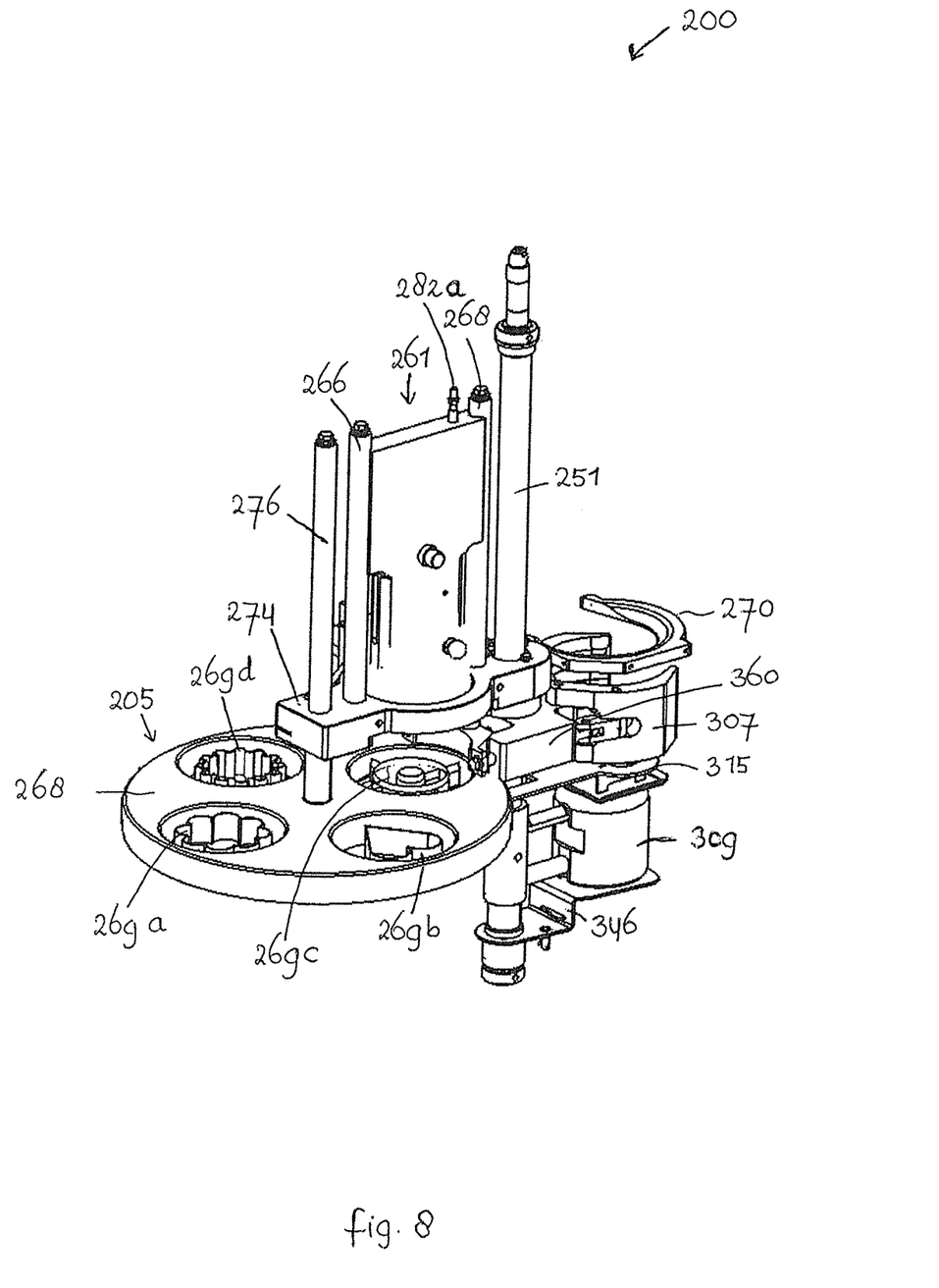
FIG. 8 is a partially cut-away perspective side back view of a third embodiment of the device according to the invention.
Figure 9:
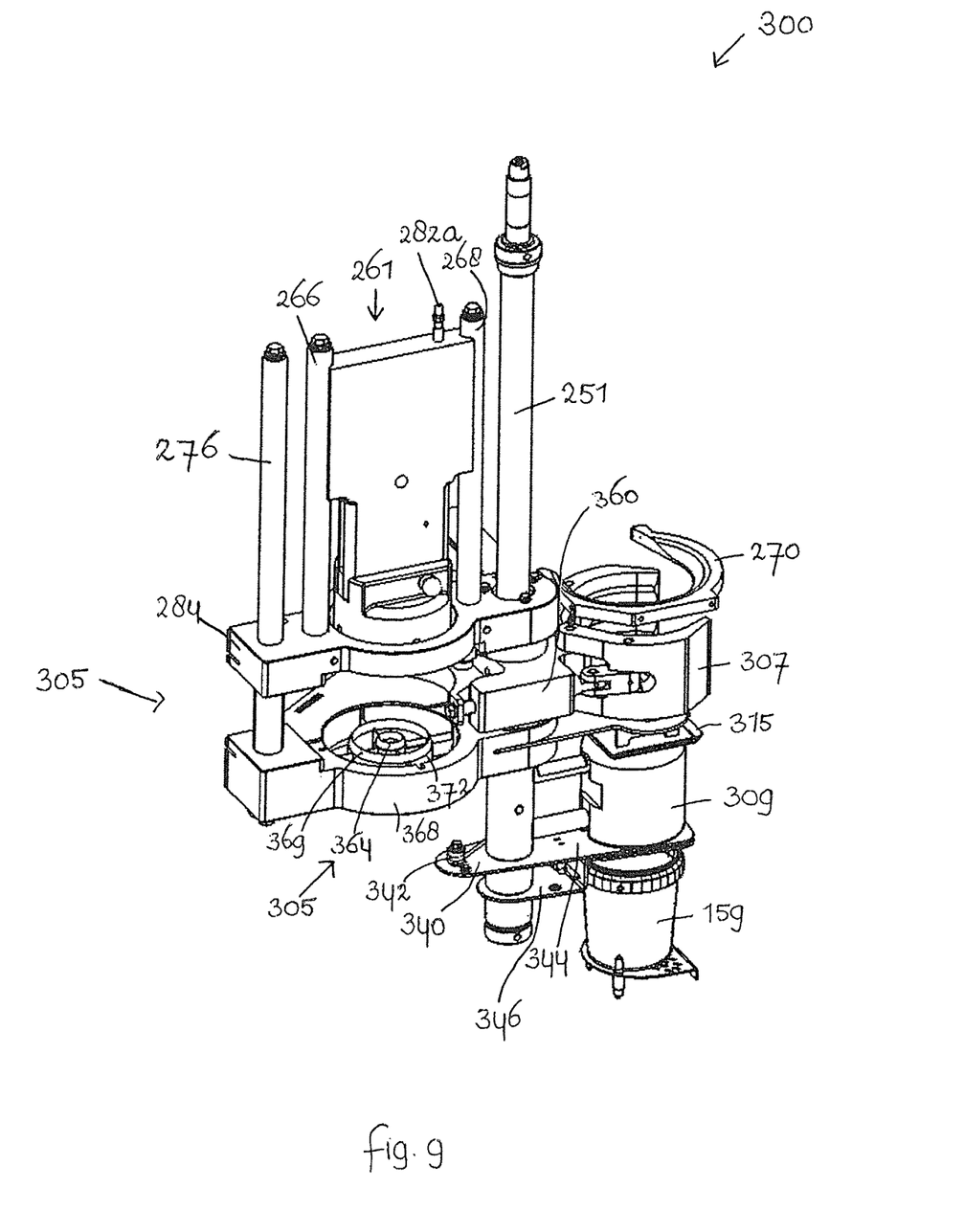
FIG. 9 is a partially cut-away perspective side view of a fourth embodiment of the device according to the invention.

FIGS. 8 and 9 show a third and a fourth embodiment of the device 200; 300 according to the invention. The devices 200; 300 only differ, in that the second processing unit 205; 305 is different. The second processing unit 205 differs from the second processing unit 305, because the knife holder is a rotatable carousel 268 instead of a stationary knife holder 368. The carousel 268 comprises four different shaped knives 269a, 269b, 269c, 269d, wherein each knife can cut a pineapple in a different shape. For example, the heart shaped knife 268b provides heart shaped pineapple flesh. A rotatable carousel having a number of different shaped knives may have a minimum of two different shaped knives and a maximum of six different shaped knives. The carousel 268 is rotatable connected to a vertically extending support post 276. The support post 276 is connected to the central frame 251 by means of a horizontally extending support arm 274. The support arm 274 also supports the vertically extending pusher posts 266, 267. Between the pusher posts 266, 267 a pusher 261 can be vertically moved from a first position to a second position closer to the knives and vice versa. The carousel 268 can be rotated about the support post 276 manually by an operator. The carousel 268 can be provided with visualizations and/or a tactile element for an operator to align a knife 269a, 269b, 269c, 269d in a correctly aligned position below the pusher 261 for cutting the pineapple during manually rotating the carousel 268. It is also possible that the device 200; 300 has a motor to rotate the carousel, such that after selecting the desired cutting shape via a user interface (not shown) the motor rotates the carousel automatically to the requested knife below the pusher 261. The motor can be located inside a component of the device, for example inside the supporting arm 274.

The device 300 comprises a second processing unit 305 comprising a stationary knife holder 368 supporting a knife 369.

The pusher 261 operates in a corresponding manner as the pusher 61. In addition, the pusher 261 of the device 200; 300 has a core removal unit inside the pusher 261. Upon pushing a pineapple by means of the pusher 261 for cutting the pineapple by means of a knife, the core is automatically removed by means the core removal unit inside the pusher 261, i.e. by means of the pusher 261 cutting the pineapple and core removal are performed simultaneously in one single motion of the pusher 261. The pusher 261 having the core removal unit inside does no longer require the core removal station 11 (FIGS. 3-5).

Figure 10A:
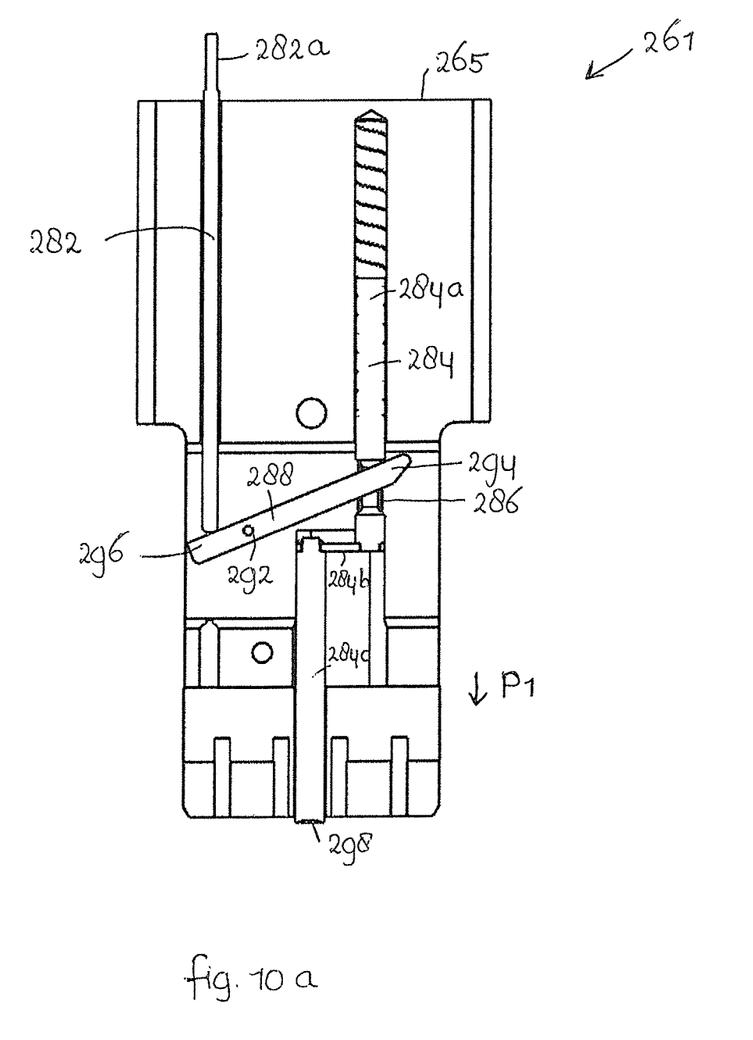
FIGS. 10a,b show details of a pusher of the device according to the invention.

FIGS. 10a,b show the pusher 261 and the core removal unit inside the pusher 261. The core removal unit comprises a stationary rod 282, wherein an external end part 282a of the stationary rod 282 is connected to the fixed world, i.e. the stationary rod 282 can be connected to at least one of the pusher posts 266, 268 or the stationary central frame 251 such that the stationary rod does not move upon movement of the pusher 261 from the first position to the second position. The vertical movement direction of the pusher 261 from the first position to the second position is indicated by arrow P1. The core removal unit further comprises a spring loaded rod 284 having a first section 284a provided with an opening 286, a second section 284b and a third section 286c. An end 298 of the third section 284c opposite to the second section 284b is or will be brought into contact with the core of the pineapple. The sections 284a, 284b, 284c are connected to each other. The horizontal extending second section 284b is shorter than the vertical extending first section 284a and the vertical extending third section 284a. In addition, the core removal unit comprises a seesaw element 288 having a first end 294 located in the opening 286 of the first section 284a of the spring loaded rod 284 and a second end 296 in contact with the stationary rod 282. The seesaw element 288 comprises a pivot 292 which is located closer to the second end 296 than to the first end 294.

The pusher 261 can be moved from a first position (FIG. 10a) to a second position (FIG. 10b), wherein during the movement from the first to the second position the pineapple is pushed through the inner knife 364 and outer knife 372 for simultaneously coring and peeling the pineapple. The core removal unit assists the knife 369 in the core removal process. After starting to move the pusher 261 from the first position to the second position the contact between the seesaw element 288 and the stationary rod 282 will be lost, because all the components of the pusher 261 with the exception of the stationary rod 282 will move in the direction of arrow P1. During this movement the spring loaded rod 284 cannot move with respect to the pusher 261 because the end 298 of the spring loaded rod 284 is or will be positioned against the core of the pineapple to be cut. The vertical distance between the inner end of the stationary rod 282 and the second end 296 of the seesaw will gradually increase as the pusher 261 moves further towards the second position. At a certain point between the first and the second position, which differs between different pineapples, the spring force of the spring 302 is larger than forces between the remaining of the uncut core and the flesh of the pineapple such that the spring force will release and will shoot the spring loaded rod away in a direction indicated by arrow P1 from the position shown in FIG. 10a to the position shown in FIG. 10b thereby forcing the core of the pineapple through the inner blade 364 of the knife 369. The maximum stroke or maximum vertical distance to be traveled by the spring loaded rod 284 is restricted by the seesaw 288 and the stationary rod 282, i.e. upon release of the spring loaded rod 284 the seesaw 288 rotates about pivot 292 in a direction indicated by arrow P2 till the second end 296 abuts the end of the stationary rod 282. After coring and peeling the pineapple, the pusher 261 is moved from the second position to the first position in an opposite direction as indicated by arrow P1. However, as the second end 296 of the seesaw element 288 abuts against the stationary rod 282, the movement of the pusher 261 rotates the seesaw 288 about the pivot 292 in a direction opposite to arrow P2 and thereby pushing the spring loaded rod against the spring force towards the position shown in FIG. 10a.

The device 200; 300 further comprises a positioner 270 facilitating correctly positioning a pineapple in a gripping mechanism 307, a support 315 for supporting a pineapple to clamped by means of the gripping mechanism 307, a container 309 and a spring loaded drop mechanism 340 to remove the pineapple flesh from the container 309 into the bucket 159.

The drop mechanism 340 comprises a spring 342, a first support plate 344 and a second support plate 346 having an opening (not shown) corresponding with the opening of the bottomless container 309. During rotating the container 309 to the end position the spring 342 of the drop mechanism 340 is tensioned, wherein in the end position the spring is released thereby rotating the first support plate 344 quickly with respect to the container 309 such that the pineapple flesh is able to fall in the desired shape and configuration into the bucket 159.

The device 200; 300 may have a single motor 360 to rotatable move the gripping mechanism 307, the container 309 and the drop mechanism 340 and/or the motor 360 is able to rotatable move the gripping mechanism 307, the container 309 and the drop mechanism 340 simultaneously about 360 degrees around the central frame 251 in the processing of one pineapple.

Figure 11:
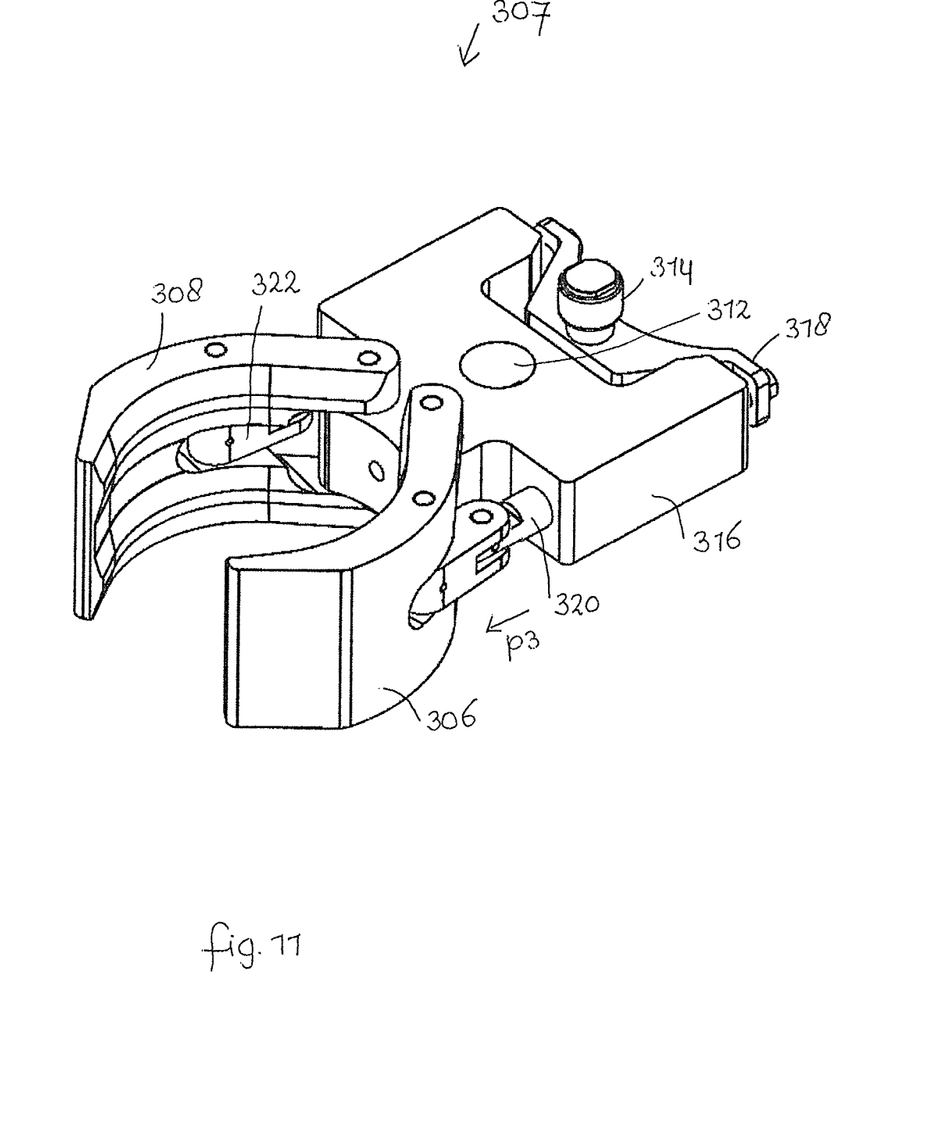
FIG. 11 is a perspective view of another embodiment of a clamping unit of the device according to the present invention.

FIG. 11 shows the gripping mechanism 307 shown in FIGS. 8 and 9. The gripping mechanism 207 has a support 316 comprising an opening 312. By means of the opening 312 the support 316 of the gripping mechanism 207 is connected to the central frame 251. The gripper mechanism 307 comprises a cam mechanism to move the gripping arms 306, 308 from an open position as shown in FIG. 11 to a closed position to clamp a pineapple. The cam mechanism comprises a mover 318 having a cam follower 314, a cam (not shown) and guide pins 320, 322. A first end of each guide pin 320, 322 is connected to the mover and a second end of each guide pin 320, 322 is pivotally connected to the gripping arms 306, 308. The guide pins 320, 322 extend in a moveable manner through the stationary support 316. Upon rotating the gripping mechanism around the central frame 251 from the input position to the processing units 305 the gripping arms are automatically moved by means of the cam and the cam follower 314 from the open position to the closed position for clamping a pineapple. A rotating angle of about 15 degrees of the gripping mechanism 307 is preferred from the input position to rotate the gripping arms 306, 308 from the open position to the closed position.

The invention claimed is:

1. Device for processing a pineapple comprising a carrier for carrying the pineapple to be processed, a first processing unit for removing the outer ends from the pineapple carried by the carrier, and a second processing unit comprising a pusher and a knife with two concentric blades, characterized in that the carrier comprises a clamping unit, wherein by use of the pusher, the pineapple without its outer ends is substantially vertically pushed out of the clamping unit through the knife for simultaneously coring and peeling the pineapple, and a container below the knife for collecting the pineapple flesh,
  wherein the container is displaceable along at least a part of a substantially circular path.

2. Device according to claim 1, further comprising a driving unit for displacing the clamping unit from an input position that positions the pineapple into the first processing unit to the second processing unit.

3. Device according to claim 1, wherein the clamping unit comprises a cylindrical sleeve with a clamping element attached to an inside wall of the cylindrical sleeve.

4. Device according to claim 1, wherein the clamping unit comprises a gripping mechanism having at least two gripping arms moveable from an open position, for positioning a pineapple between the arms, to a clamp position for holding and clamping the pineapple to be processed.

5. Device according to claim 1, wherein the clamping unit is displaceable in a substantially horizontal direction from an input position to the second processing unit.

6. Device according to claim 1, wherein the clamping unit is displaceable along at least a part of a substantially circular path.

7. Device according to claim 6, wherein the clamping unit is rotatably connected to a stationary central frame part.

8. Device according to claim 1, wherein a vertical distance between the knife and the container is smaller than 10 cm.

9. Device according to claim 8, wherein the container comprises a bottom and a central discharge channel for discharging the core through the bottom, wherein an inner diameter of the discharge channel substantially corresponds to an inner diameter of the inner blade of the knife.

10. Device according to claim 8, wherein the container further comprises two opposing open sides.

11. Device according to claim 8, wherein the container is displaceable by a driving element from a position below the knife to an output position near an input position that positions the pineapple into the first processing unit.

12. Device according to claim 8, wherein the container is displaceable in a substantially horizontal direction from a position below the knife to an output position.

13. Device according to claim 1, wherein the container is rotatably connected to a stationary central frame.

14. Device according to claim 11, wherein a center of the container in the output position substantially coincides with a center of the clamping unit in the input position.

15. Device according to claim 1 further comprising at least one additional processing unit comprising a further cutting station.

16. Device according to claim 1, wherein the two concentric blades of the knife are connected by at least one spacer.

17. Device according to claim 16, wherein the knife comprises a number of spacers, circumferentially divided between the blades about equal angles.

18. Device according to any claim 1, wherein the container further comprises a container wall comprising openings.

19. Device according to claim 1, wherein at least the clamping unit and the knife are detachably connectable to the device.

20. Device for processing a pineapple comprising a carrier for carrying the pineapple to be processed, a first processing unit for removing the outer ends from the pineapple carried by the carrier, and a second processing unit comprising a pusher and a knife with two concentric blades, characterized in that the carrier comprises a clamping unit, wherein by use of the pusher, the pineapple without its outer ends is substantially vertically pushed out of the clamping unit through the knife for simultaneously coring and peeling the pineapple, and further comprising a driving unit for displacing the clamping unit from an input position that positions the pineapple into the first processing unit to the second processing unit, and
  wherein the driving unit and a driving element are connected to a stationary central frame part.

21. Device according to claim 2, wherein the driving unit and a driving element simultaneously displace the clamping unit and the container after the pineapple has been processed in the second processing unit.

22. The device of claim 15, wherein the further cutting station comprises cutters for further cutting the pineapple.

23. Device for processing a pineapple comprising a carrier for carrying the pineapple to be processed, a first processing unit for removing the outer ends from the pineapple carried by the carrier, and a second processing unit comprising a pusher and a knife with two concentric blades, characterized in that the carrier comprises a clamping unit, wherein by use of the pusher, the pineapple without its outer ends is substantially vertically pushed out of the clamping unit through the knife for simultaneously coring and peeling the pineapple, and
  further comprising at least one additional processing unit comprising a further cutting station, and
  wherein the further cutting station comprises cutters for further cutting the pineapple, and
  wherein the cutters are pivotable about a pivot axis.

24. The device of claim 22 wherein the cutters rotate into openings or notches of a container located below the knife.

* * * * *